United States Patent
Ko

(10) Patent No.: US 9,746,616 B2
(45) Date of Patent: Aug. 29, 2017

(54) OPTICAL MODULE OF MICRO SPECTROMETER WITH TAPERED SLIT AND SLIT STRUCTURE THEREOF

(75) Inventor: Cheng-Hao Ko, Hsinchu County (TW)

(73) Assignee: OTO PHOTONICS INC., Hsinchu (TW)

( * ) Notice: Subject to any disclaimer, the term of this patent is extended or adjusted under 35 U.S.C. 154(b) by 109 days.

(21) Appl. No.: 13/642,828

(22) PCT Filed: Apr. 29, 2010
(Under 37 CFR 1.47)

(86) PCT No.: PCT/CN2010/072336
§ 371 (c)(1),
(2), (4) Date: Jul. 12, 2013

(87) PCT Pub. No.: WO2011/134156
PCT Pub. Date: Nov. 3, 2011

(65) Prior Publication Data
US 2014/0002820 A1    Jan. 2, 2014

(51) Int. Cl.
*G01J 3/28*    (2006.01)
*G02B 6/34*    (2006.01)
(Continued)

(52) U.S. Cl.
CPC .............. *G02B 6/34* (2013.01); *G01J 3/0256* (2013.01); *G01J 3/04* (2013.01); *G01J 3/20* (2013.01); *G01J 3/2803* (2013.01); *G02B 6/26* (2013.01)

(58) Field of Classification Search
CPC .. G02B 6/26; G02B 6/34; G01J 3/0256; G01J 3/0259; G01J 3/04; G01J 3/20; G01J 3/2803
(Continued)

(56) References Cited

U.S. PATENT DOCUMENTS 3,680,965 A * 8/1972 Dilworth .................. G01J 1/48
346/107.2
3,850,526 A * 11/1974 Corey, III ..................... 356/512
(Continued)

FOREIGN PATENT DOCUMENTS

CN    1854696         11/2006
CN    1854696 A       11/2006
(Continued)

*Primary Examiner* — Kara E Geisel
*Assistant Examiner* — Hina F Ayub
(74) *Attorney, Agent, or Firm* — Chieh-Mei Wang

(57) ABSTRACT

An optical module of a micro spectrometer with tapered slit and slit structure thereof. The optical module includes an input section and a micro diffraction grating. The input section includes a slit structure, which receives a first optical signal and outputs a second optical signal travelling along a first optical path. The slit structure includes a substrate and a slit, which penetrates through the substrate and has a gradually reduced dimension from a first surface of the substrate to a second surface of the substrate. The micro diffraction grating, disposed on the first optical path, receives the second optical signal and separates the second optical signal into a plurality of spectrum components travelling along a second optical path. The optical module of the micro spectrometer with the tapered slit and slit structure thereof according to the embodiment of the invention can be manufactured in a mass-production manner using the semiconductor manufacturing processes, so that the cost can be decreased, and the slit can have a smooth surface, which avoids the negative effect on the incident light.

14 Claims, 6 Drawing Sheets

(51) Int. Cl.
*G01J 3/02* (2006.01)
*G01J 3/04* (2006.01)
*G01J 3/20* (2006.01)
*G02B 6/26* (2006.01)

(58) Field of Classification Search
USPC .................................. 356/300–334, 402–445
See application file for complete search history.

(56) References Cited

U.S. PATENT DOCUMENTS

| | | | |
|---|---|---|---|
| 5,182,609 A | | 1/1993 | Florek et al. |
| 5,550,375 A | * | 8/1996 | Peters et al. .................. 250/343 |
| 5,902,994 A | * | 5/1999 | Lisson ............... H04N 1/00002 250/205 |
| 5,914,997 A | | 6/1999 | Van Egeraat |
| 6,058,003 A | * | 5/2000 | Hirano et al. ................ 361/225 |
| 6,075,609 A | * | 6/2000 | Tarkanic et al. ............. 356/417 |
| 7,034,935 B1 | | 4/2006 | Kruzelecky |
| 2002/0034457 A1 | * | 3/2002 | Reichert et al. ............ 422/82.11 |
| 2004/0131312 A1 | * | 7/2004 | Ohlander ............ G02B 6/4215 385/37 |
| 2004/0156590 A1 | * | 8/2004 | Gunn, III ............. G02B 6/1228 385/37 |
| 2005/0151966 A1 | | 7/2005 | Packirisamy et al. |
| 2006/0055935 A1 | * | 3/2006 | Cheben .................... G01J 3/02 356/451 |
| 2006/0262303 A1 | * | 11/2006 | Bonne .................. G01F 1/6845 356/328 |
| 2007/0291266 A1 | | 12/2007 | Handa et al. |
| 2008/0068748 A1 | * | 3/2008 | Olson et al. .................. 360/110 |
| 2008/0074664 A1 | * | 3/2008 | Ganiere .................... G01J 3/04 356/308 |
| 2008/0225392 A1 | | 9/2008 | Ko |
| 2009/0245718 A1 | * | 10/2009 | Li ........................ B82Y 20/00 385/12 |
| 2009/0284741 A1 | | 11/2009 | Shibayama et al. |
| 2009/0290154 A1 | | 11/2009 | Shibayama et al. |
| 2010/0039643 A1 | | 2/2010 | Park et al. |
| 2010/0128263 A1 | * | 5/2010 | Kobayashi ............... G01J 3/06 356/300 |
| 2010/0208259 A1 | | 8/2010 | Suzuki et al. |
| 2010/0225898 A1 | * | 9/2010 | Lenke ................... G01N 13/00 356/51 |
| 2010/0315634 A1 | | 12/2010 | Shibayama |
| 2011/0146055 A1 | | 6/2011 | Shibayama |
| 2012/0127467 A1 | * | 5/2012 | Ivanov et al. ................ 356/326 |

FOREIGN PATENT DOCUMENTS

| | | |
|---|---|---|
| CN | 101021437 A | 8/2007 |
| CN | 101055323 A | 10/2007 |
| JP | 63075523 | 4/1988 |
| TW | M370071 U1 | 12/2009 |
| WO | WO 00/54030 | 9/2000 |
| WO | WO0054030 A2 | 9/2000 |

* cited by examiner

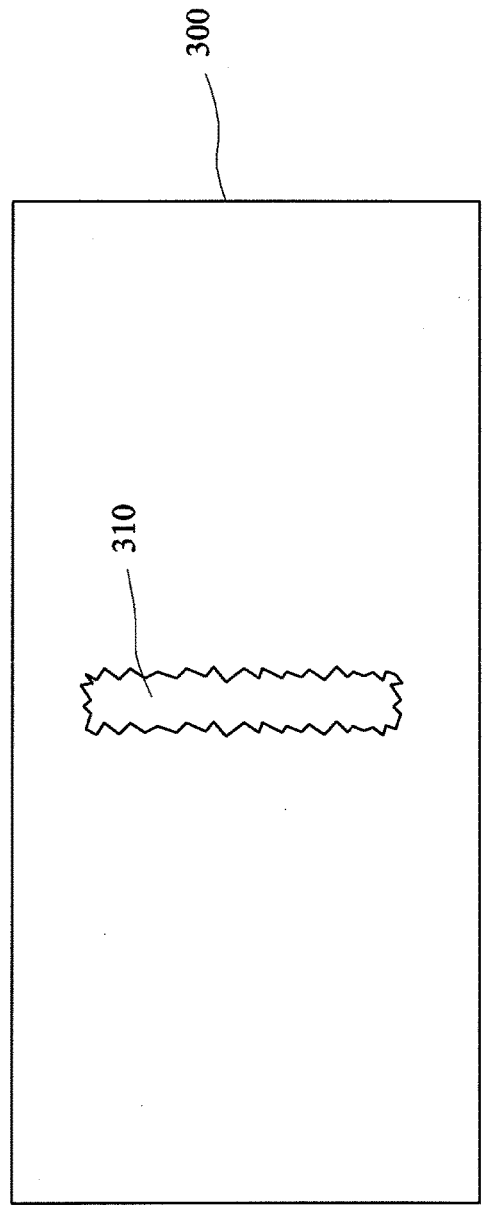
FIG. 1 (Prior Art)
FIG. 2 (Prior Art)

OPTICAL MODULE OF MICRO SPECTROMETER WITH TAPERED SLIT AND SLIT STRUCTURE THEREOF

BACKGROUND OF THE INVENTION

Field of the Invention

The invention relates to an optical module of a micro spectrometer with a tapered slit and a slit structure thereof, and more particularly to a tapered slit formed by way of wet etching to serve as an element of an optical module of a micro spectrometer, and a slit structure of the micro spectrometer.

Related Art

A spectrometer is usually utilized to perform the measurement of the photometry of a radiation source, and a slit structure has to be used at a light entrance of the spectrometer to control a quantitative amount of light to enter the spectrometer. A slit with a very smooth and sharp opening has an important effect on the image quality and the resolution at the sensor end. Optically, the edge of this very smooth and sharp opening is referred to as a "knife edge." However, because the opening of the slit of the conventional spectrometer has to be relatively long to permit the sufficient light input amount, the slit formed by semiconductor manufacturing processes using a substrate made of a silicon material or another semiconductor material appears to be very fragile and inadequate. Thus, the slit structure used in the conventional spectrometer is typically manufactured from a non-semiconductor material by way of electrical discharge machining (EDM). FIGS. 1 and 2 are a front view and a top view respectively showing a conventional slit structure 300. As shown in FIG. 2, a slit 310 of the slit structure 300 is manufactured by way of EDM, so its surface flatness is poor and has many sawtooth-like patterns. These sawtooth-like patterns may affect the incident light and cause the negative influence on the efficiency of the spectrometer. In addition, the electrical discharge machining (EDM) spends the higher cost and is not suitable for the mass production.

FIG. 3 is a schematic illustration showing a conventional spectrometer 100. Referring to FIG. 3, the conventional spectrometer 100 includes a light source 110, an input section 120, a collimator 130, a plane grating 140, a focus mirror 150 and a linear photosensor 160. The light source 110 outputs an optical signal 200, which passes through the input section 120 and the collimator 130 in the free space and then reaches the plane grating 140. A diffraction pattern 142 of the plane grating 140 has a plane macroscopic profile. Such a plane grating 140 is more suitable for the conventional machining method of ruling diffraction patterns on a metal surface using a diamond knife. However, the profile of the grating cannot be formed into a curved surface for providing the focus function using this machining method. Therefore, after the plane grating 140 separates the optical signal into several spectrum components, the focus mirror 150 has to be provided to focus these spectrum components onto the linear photosensor 160. As a result, the spectrometer 100 has the very long overall optical path, and the relatively large size. However, due to the optical module structure and the optical path of the conventional spectrometer, the light input amount of the conventional spectrometer may be very large, and the influence of the stray light on the diffraction result is relatively small. So, the problem of the influence of the stray light on the to-be-detected signal needs not to be considered in the conventional spectrometer, and the required smoothness of the slit 310 of the input section 120 is thus not high. As a result, the conventional slit structure manufactured by way of EDM still can be used, but is not adapted to the micro spectrometer, in which the light input amount is relatively small.

SUMMARY OF THE INVENTION

It is therefore an object of the invention to provide a slit structure, which is suitable for the mass production so that a micro spectrometer equipped with this slit structure or an optical module of the micro spectrometer can have the reduced cost.

Another object of the invention is to provide a slit structure with a smooth slit surface so that the micro spectrometer equipped with this slit structure can have the enhanced efficiency.

The invention achieves the above-identified objects by providing an optical module of a micro spectrometer. The optical module includes an input section and a micro diffraction grating. The input section includes a slit structure, which receives a first optical signal and outputs a second optical signal travelling along a first optical path. The slit structure includes a substrate and a slit, which penetrates through the substrate and has a gradually reduced dimension from a first surface of the substrate to a second surface of the substrate. The micro diffraction grating disposed on the first optical path receives the second optical signal and separates the second optical signal into a plurality of spectrum components travelling along a second optical path.

In addition, the invention also provides a slit structure, which is adapted to an optical module of a micro spectrometer and receives a first optical signal and outputs a second optical signal. The slit structure includes a substrate and a slit. The slit penetrates through the substrate, and has a gradually reduced dimension form a first surface of the substrate to a second surface of the substrate.

The optical module of the micro spectrometer with the tapered slit and slit structure thereof according to the embodiment of the invention can be manufactured in a mass-production manner using the semiconductor manufacturing processes, so that the cost can be decreased, and the slit can have a smooth surface, which avoids the negative effect on the incident light.

BRIEF DESCRIPTION OF THE DRAWINGS

FIGS. 1 and 2 are a front view and a top view respectively showing a conventional slit structure.

SYMBOLS

Figure 3:
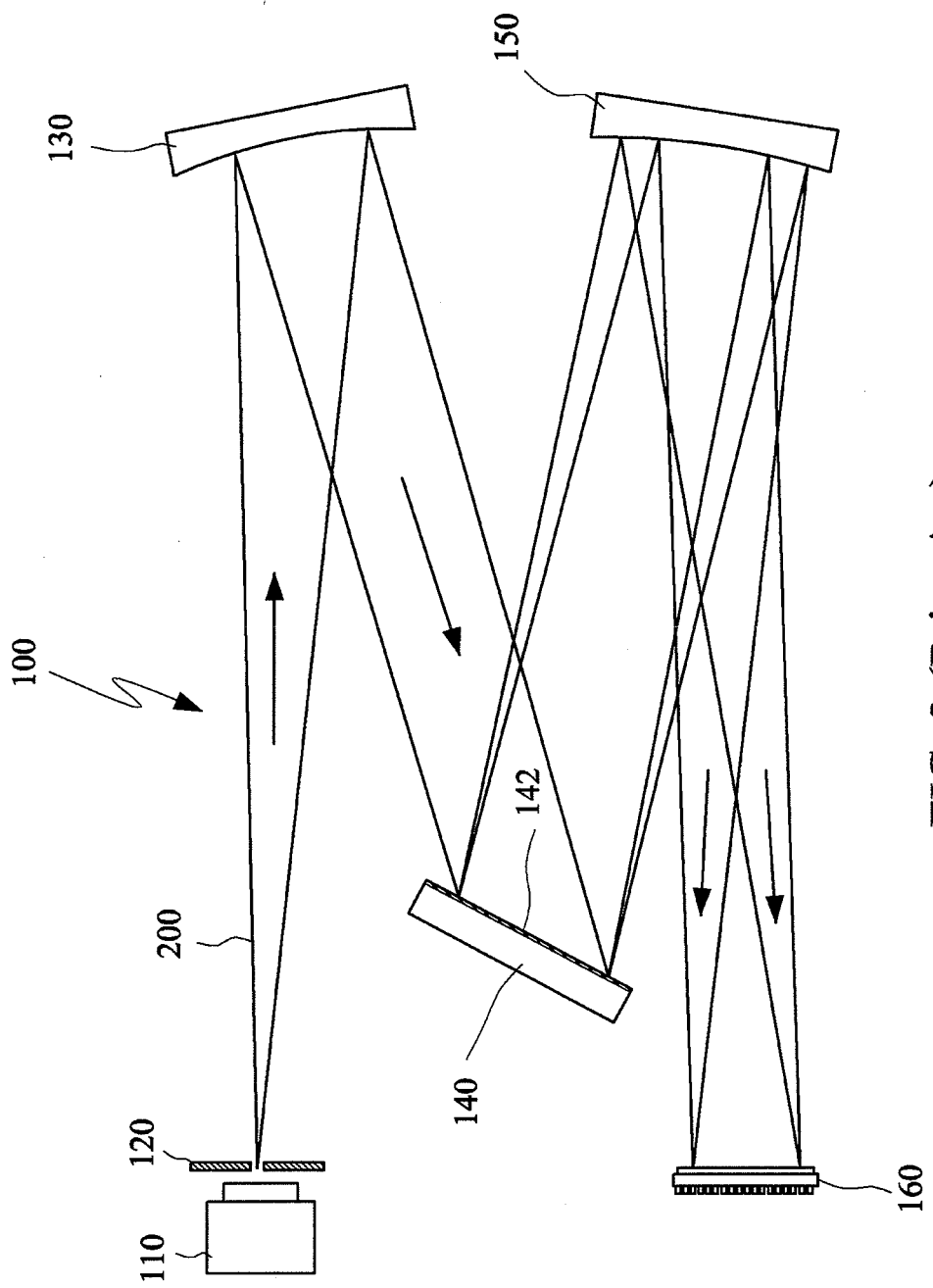
FIG. 3 is a schematic illustration showing a conventional spectrometer.

C: spectrum component
OP1: first optical path

OP2: second optical path
S1: first optical signal
S2: second optical signal
RC: Rowland circle
10: body
20: input section
30: slit structure
32: semiconductor substrate
32A: first surface
32B: second surface
34A: circumferential wall
34: slit
36: resist layer
37: opening
40: micro diffraction grating
40': micro diffraction grating
42: diffraction pattern
50: photosensor
52: photo-sensing unit
60: light emitting device
70: sample
80: waveguide
82: first waveguide sheet
84: second waveguide sheet
90: optical channel
100: spectrometer
110: light source
120: input section
130: collimator
140: plane grating
142: diffraction pattern
150: focus mirror
160: linear photosensor
200: optical signal
300: slit structure
310: slit

DETAILED DESCRIPTION OF THE INVENTION

Figure 4:
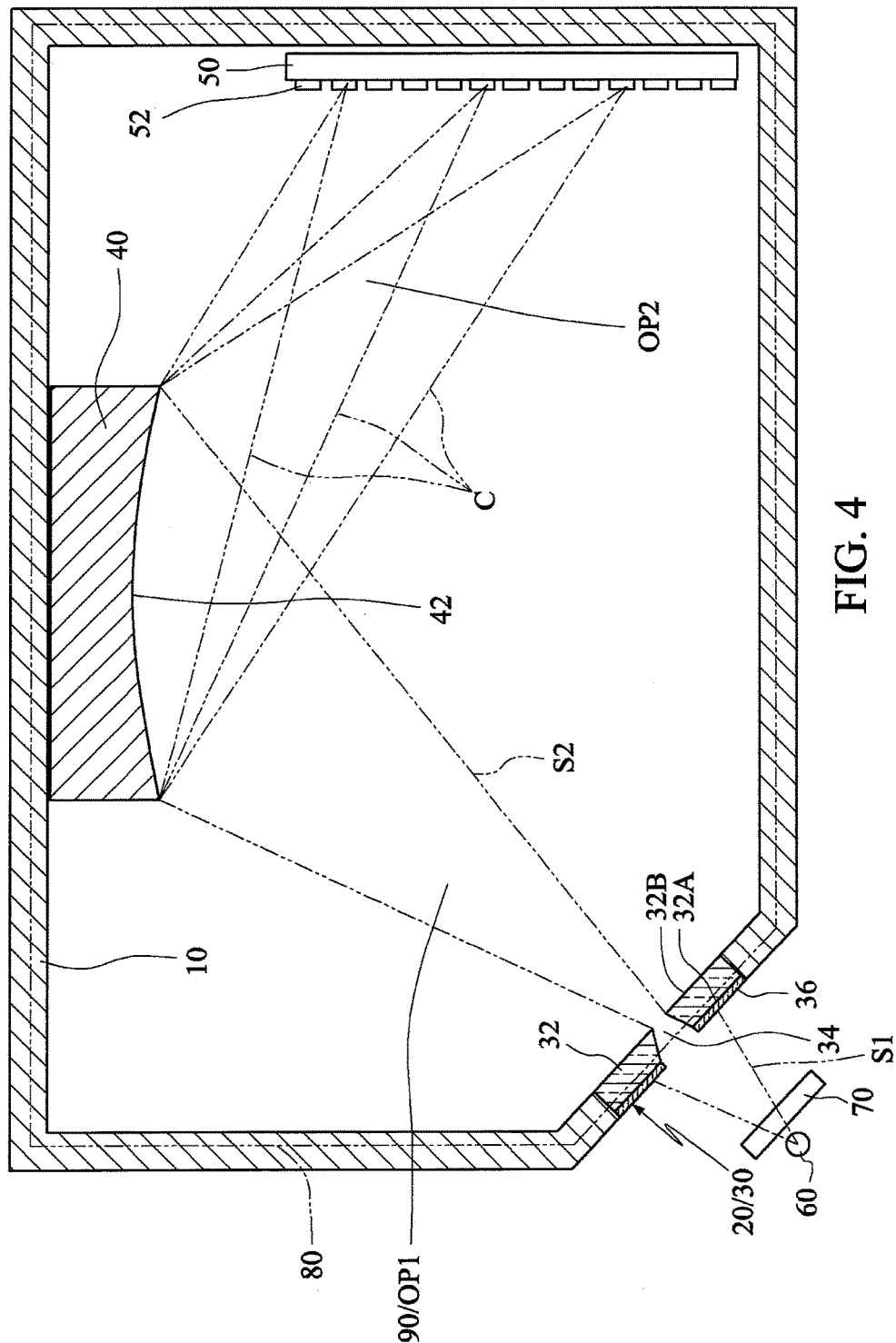
FIG. 4 is a schematic illustration showing a micro spectrometer with a tapered slit according to a preferred embodiment of the invention.

FIG. 4 is a schematic illustration showing a micro spectrometer with a tapered slit according to a preferred embodiment of the invention. Referring to FIG. 4, the micro spectrometer of this embodiment includes a body 10, an input section 20 and a micro diffraction grating 40. The input section 20 and the micro diffraction grating 40 may constitute an optical module.

In this embodiment, the input section 20 is disposed in the body 10 and includes a slit structure 30, which receives a first optical signal S1 and outputs a second optical signal S2 travelling along a first optical path OP1. In one example, the input section 20 may further include a filter for filtering out the unessential optical signal. In addition, the micro spectrometer of the invention may further include a light emitting device 60 for outputting light passing through a sample 70 to generate the first optical signal S1, wherein the sample is a test strip, for example.

The slit structure 30 includes a substrate 32 and a slit 34, which penetrates through the substrate 32 and has a gradually reduced dimension from a first surface 32A of the substrate 32 to a second surface 32B of the substrate 32. That is, the slit 34 has a substantially tapered structure. The first surface 32A is further from the micro diffraction grating 40 than the second surface 32B. The slit 34 may have a cross-sectional area with a rectangular shape, a circular shape, an elliptic shape or any other geometric shape, which does not intend to restrict the invention.

As shown in FIG. 4, the micro diffraction grating 40 disposed on the first optical path OP1 receives the second optical signal S2 and separates the second optical signal S2 into a plurality of spectrum components C travelling along a second optical path OP2.

In addition, in order to obtain and process the spectrum components C, the micro spectrometer may further include a photosensor 50, which is disposed on the second optical path OP2 and receives the spectrum components C. It is to be noted that the micro diffraction grating 40 may be an ultra-thin small part, which is manufactured by micro-electro-mechanical-system (MEMS) processes, semiconductor manufacturing processes, lithography electroforming micro molding (as referred to as LIGA) or other manufacturing processes, and is thus referred to as a micro diffraction grating. Thus, the spectrometer of the invention may be referred to as a micro spectrometer. The height of each of diffraction patterns 42 of the micro diffraction grating 40 typically ranges from several tens of microns to several hundreds of microns. The macroscopic profile of the diffraction patterns 42 of the micro diffraction grating 40 contains a curved surface, as shown in FIG. 4, rather than the conventional plane shown in FIG. 3. The curved surface functions to focus the light, passing through the micro diffraction grating 40, onto the front photosensor 50.

Figure 5:
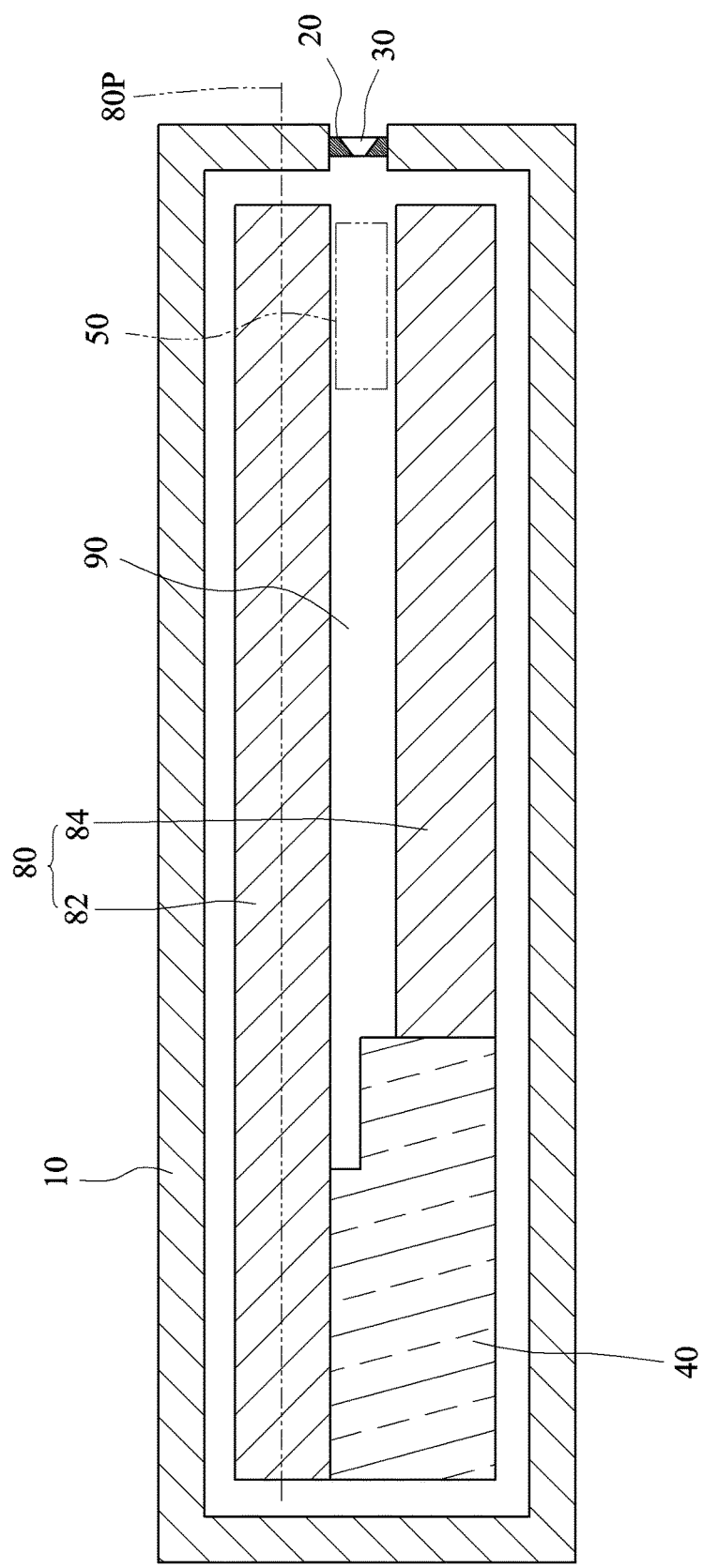
FIG. 5 is a side view showing the micro spectrometer of FIG. 4.

FIG. 5 is a side view showing the micro spectrometer of FIG. 4. Referring to FIGS. 4 and 5, the micro spectrometer may further include a waveguide 80, which guides the second optical signal S2, passing through the input section 20, to the micro diffraction grating 40 and prevents the second optical signal S2 from being diverged in the free space, so that the signal intensity, received by the micro diffraction grating 40, may be more than the noise intensity, and the ability against the noise can be thus enhanced. The waveguide 80 may include a first waveguide sheet 82 and a second waveguide sheet 84, which face each other and commonly define an optical channel 90. The optical channel 90 may be a hollow channel without any solid, liquid or even gas filled therein, and may also be filled with a suitable medium, such as the glass, plastic or acrylic material, so that the optical signal can be reflected repeatedly and forwarded in the optical channel, and it is possible to avoid the dust or other pollutants from being accumulated on the waveguide sheet to affect the smoothness and the reflectivity of the waveguide sheet. A little light can be reflected and transferred to the micro diffraction grating 40 in the optical channel 90. In addition, FIG. 5 shows the cross section open perpendicular to an extension plane 80P of the waveguide 80 extending towards the slit structure 30, while FIG. 4 shows the cross section parallel to the extension plane 80P extended from the waveguide 80. As shown in FIGS. 5 and 4, the slit 34 has the gradually reduced dimension from the first surface 32A of the substrate 32 to the second surface 32B of the substrate 32 in a sectional direction perpendicular to the extension plane 80P extended from the waveguide 80.

Figure 6:
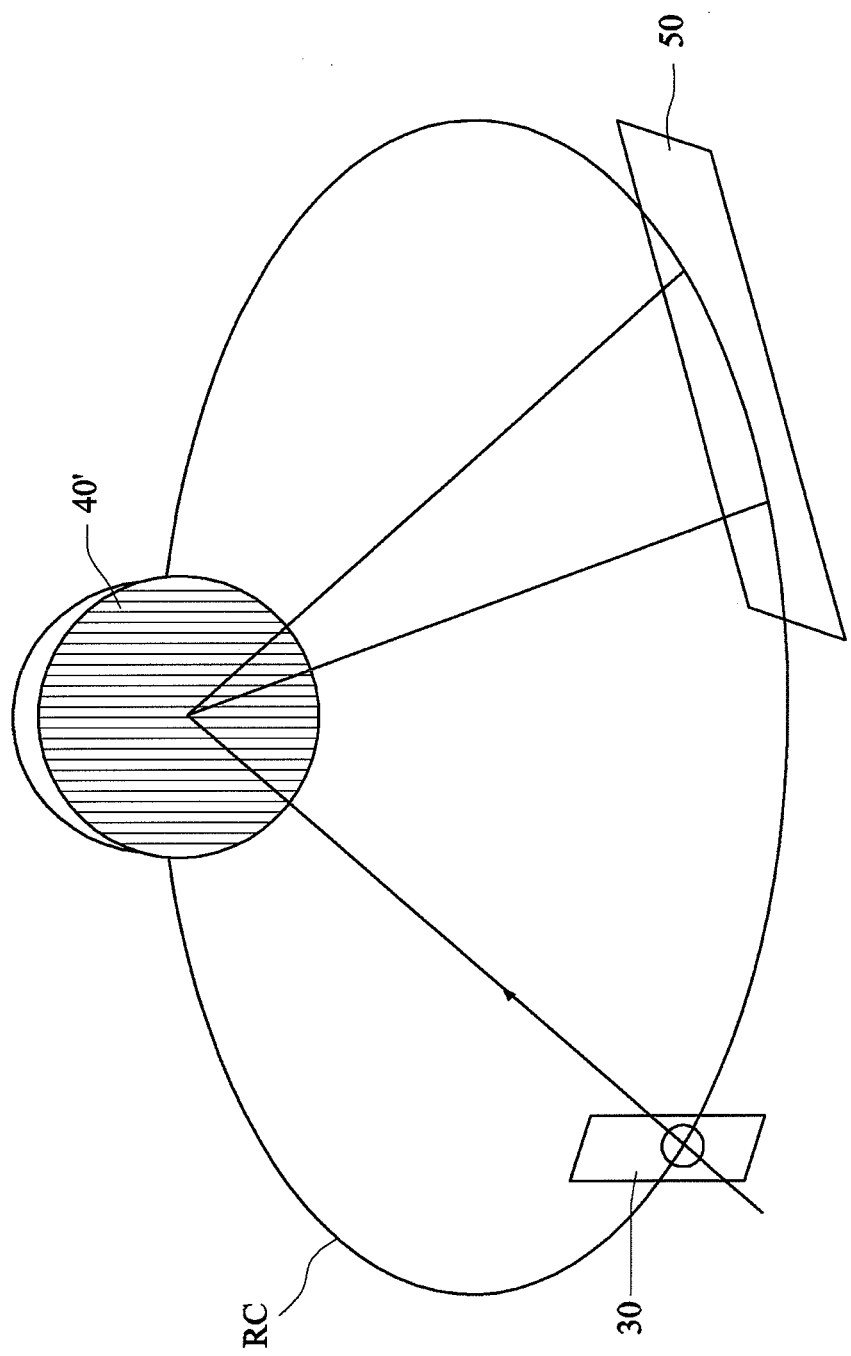
FIG. 6 is a schematic illustration explaining why the micro spectrometer of the invention can focus light on a linear sensor using the theory of a conventional Rowland circle.

FIG. 6 is a schematic illustration explaining why the micro spectrometer of the invention can focus light on a linear sensor using the theory of a conventional Rowland circle. As shown in FIG. 6 and according to the theory of Rowland circle, after the incident light passes through the slit structure 30 and reaches the micro diffraction grating 40', the light is diffracted, focused and imaged onto the Rowland circle RC. Therefore, a photosensor 50 intersecting with the Rowland circle RC can receive at least two spectrum components. Because the diffraction patterns of the micro diffraction grating 40' adapted to the Rowland circle have the constant pitches, the spectrum components only can be focused and imaged onto two points of a straight line. Changing the pitch can change the size of the Rowland circle. So, designing the diffraction patterns to have the non-constant pitches can focus at least three spectrum components onto a straight line so that the effect of FIG. 4 can be achieved.

Thus, the photosensor 50 of FIG. 4 may have a plurality of photo-sensing units 52, such as two, three or more than three photo-sensing units. The photo-sensing units 52 are arranged on a straight line.

Figure 7:
FIGS. 7 to 10 show structures corresponding to steps of the method of manufacturing the slit structure of the invention.
Figure 8:
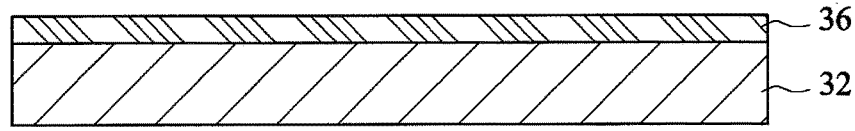
Figure 9:
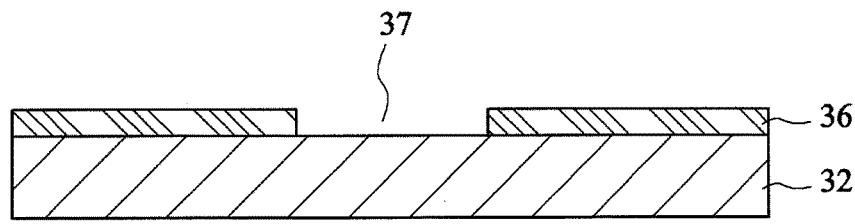
Figure 10:
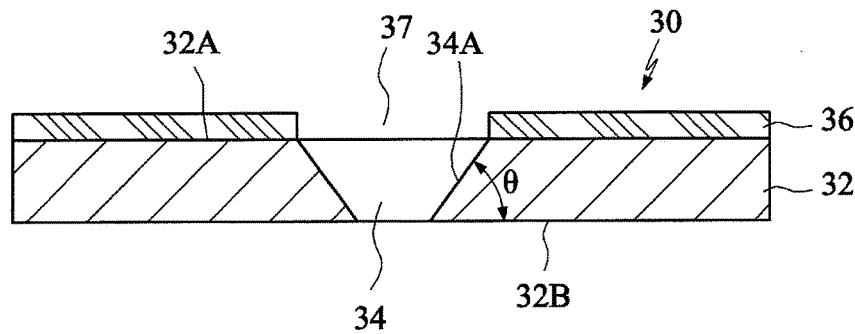
Figure 11:
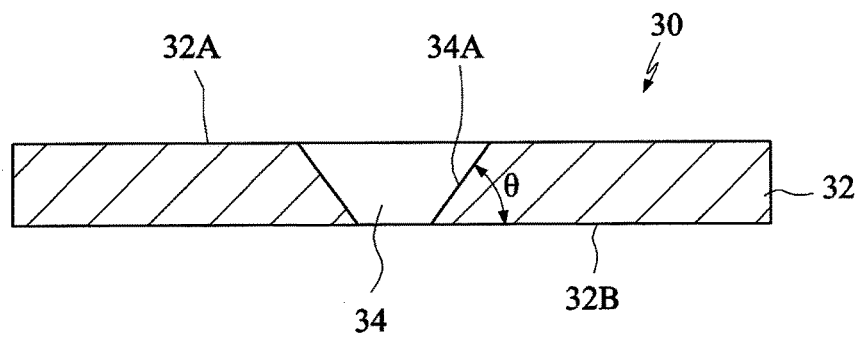
FIG. 11 shows another example of a slit structure of the invention.

Unlike the conventional metal slit structure, the slit structure 30 of the invention is formed by way of wet etching of the semiconductor manufacturing processes. FIGS. 7 to 10 show structures corresponding to steps of the method of manufacturing the slit structure of the invention. First, as shown in FIG. 7, a semiconductor substrate 32 composed of, for example, silicon, the III-V compound semiconductor material or any other semiconductor material is provided. Next, as shown in FIG. 8, a resist layer 36 is applied to the substrate 32. Then, as shown in FIG. 9, an opening 37 for exposing a portion of the substrate 32 is formed on the resist layer 36. As shown in FIG. 10, a wet etching step is performed to form the slit 34. When the silicon substrate is used, the included angle θ between the circumferential wall 34A of the slit 34 and the second surface 32B is formed in the wet etching step and is the arrangement angle of the silicon lattice. The angle is substantially equal to 54 degrees, and the smoothness of the edge of the opening 37 can also reach the level of the lattice arrangement. In addition, the surface roughness of the circumferential wall 34A of the slit 34 is less than 1 nanometer (nm), and such a slit structure may serve as an aperture of the micro spectrometer having the very small light input amount. Although the shape of the opening 37 is not particularly restricted, the rectangular shape is most frequently chosen. In one embodiment, the dimensions of the opening 37 on the second surface 32B of FIG. 11 are measured, and the length and width of the opening are substantially equal to 150 and 25 microns, respectively.

Therefore, the substrate 32 of the slit structure 30 includes the semiconductor material, such as the silicon material, the III-V compound semiconductor material or any other semiconductor material. It is to be noted that the resist layer 36 may be removed in the subsequent step, and may also be kept to be a portion of the slit structure 30. Alternatively, the resist layer 36 may also be removed so that the final slit structure 30 does not contain the resist layer 36, as shown in FIG. 11. The slit structure of the invention can be manufactured in a mass production manner using the semiconductor manufacturing processes so that the cost can be decreased, and the slit can have the smooth surface, which avoids the negative effect on the incident light.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An optical module of a micro spectrometer, the optical module comprising:
    an input section, comprising a slit structure, which receives a first optical signal and outputs a second optical signal travelling along a first optical path, the slit structure comprising a substrate and a slit, the substrate having a first surface and a second surface opposite to the first surface, wherein the slit penetrates through the substrate and extends from the first surface to the second surface, a surface roughness of a circumferential wall of the slit is less than 1 nanometer, and an included angle between the circumferential wall of the slit and the second surface is an arrangement angle of a silicon lattice;
    a micro diffraction grating, which is disposed on the first optical path, receives the second optical signal and separates the second optical signal into a plurality of spectrum components travelling along a second optical path, wherein the first surface is further from the micro diffraction grating than the second surface; and
    a waveguide, which guides the second optical signal passing through the input section to the micro diffraction grating, and comprises a first waveguide sheet and a second waveguide sheet, the first waveguide sheet having a waveguide surface that is substantially parallel with an extension plane of the waveguide extending towards the slit structure, the second waveguide sheet having a non-waveguide sidewall that is not parallel with the extension plane of the waveguide, wherein:
        the micro diffraction grating is further disposed on the waveguide surface and abuts the non-waveguide sidewall;
        the slit has a first width gradually decreasing from the first surface to the second surface, wherein the first width runs in a first direction perpendicular to the waveguide surface; and
        the slit further has a second width gradually decreasing from the first surface to the second surface, wherein the second width runs in a second direction parallel with the extension plane of the waveguide.

2. The optical module according to claim 1, wherein the first waveguide sheet and the second waveguide sheet face each other to commonly define an optical channel, and wherein the second optical signal is reflected in the optical channel and transferred to the micro diffraction grating.

3. The optical module according to claim 2, wherein the optical channel is a hollow channel.

4. The optical module according to claim 2, wherein the optical channel is filled with glass, plastic or acrylic.

5. The optical module according to claim 1, further comprising a photosensor, which is disposed on the second optical path and receives the spectrum components.

6. The optical module according to claim 1, wherein the substrate of the slit structure is a substrate composed of a semiconductor material.

7. The optical module according to claim 6, wherein the semiconductor material is a silicon or III-V compound semiconductor material.

8. The optical module according to claim 1, wherein the included angle between a circumferential wall of the slit and the second surface is substantially equal to 54 degrees.

9. The optical module according to claim 1, wherein the slit structure further comprises a resist layer, disposed on the first surface.

10. A slit structure adapted to a micro spectrometer, the micro spectrometer comprising a micro diffraction grating and a waveguide, the slit structure receiving a first optical signal and outputting a second optical signal, the slit structure comprising:
    a substrate; and
    a slit, which penetrates through the substrate and has a first width gradually decreasing from a first surface of the substrate to a second surface of the substrate, wherein the first width runs in a first direction perpendicular to an extension plane of the waveguide extending towards the slit structure, wherein the first surface of the substrate is farther from the micro diffraction grating than the second surface of the substrate, and wherein an opening of the slit on the first surface is greater than an opening of the slit on the second surface, and the slit further has a second width gradually decreasing from the first surface to the second surface, and the second width runs in a second direction parallel with the extension plane of the waveguide;

wherein a surface roughness of a circumferential wall of the slit is less than 1 nanometer, and an included angle between the circumferential wall of the slit and the second surface is an arrangement angle of a silicon lattice.

11. The slit structure according to claim 10, wherein the substrate of the slit structure is a substrate composed of a semiconductor material.

12. The slit structure according to claim 11, wherein the semiconductor material is a silicon or III-V compound semiconductor material.

13. The slit structure according to claim 10, wherein the included angle between a circumferential wall of the slit and the second surface is substantially equal to 54 degrees.

14. The slit structure according to claim 10, further comprising a resist layer, disposed on the first surface.

* * * * *